Aug. 6, 1968 C. L. BUDDECKE ET AL 3,396,305

IMAGE PROJECTION DEVICE

Filed May 4, 1965 3 Sheets-Sheet 1

*INVENTORS*
CHARLES L. BUDDECKE
WILLIAM E. MEYER
RANDALL S. STITES
Roy M. Pitts
ATTORNEY

IMAGE PROJECTION DEVICE

Filed May 4, 1965 3 Sheets-Sheet 2

INVENTORS
CHARLES L. BUDDECKE
WILLIAM E. MEYER
RANDALL S. STITES

Roy M Pitts
ATTORNEY

IMAGE PROJECTION DEVICE

Filed May 4, 1965 3 Sheets-Sheet 3

INVENTORS
CHARLES L. BUDDECKE
WILLIAM E. MEYER
RANDALL S. STITES

ATTORNEY 3,396,305
Patented Aug. 6, 1968

3,396,305

IMAGE PROJECTION DEVICE

Charles L. Buddecke, Fullerton, William E. Meyer, Buena Park, and Randall S. Stites, Costa Mesa, Calif., assignors to North America Rockwell Corporation, a corporation of Delaware Filed May 4, 1965, Ser. No. 453,125
11 Claims. (Cl. 315—12)

ABSTRACT OF THE DISCLOSURE

Image projection apparatus for converting electric signals into an optical image. In an electron-beam tube device for influencing a beam of polarized light, there is provided a birefringent electro-optic material, one face of which is sealingly coated with a locally secondarily emissive film of one of silicone monoxide/dioxide and magnesium flouride and not exceeding a thickness of 15,000 angstroms.

The subject invention relates to image projection apparatus, and more particularly to projection means for converting electrical signals into an optical image.

The conversion of electrical signals into optical images by means of such devices as cathode ray tubes and the like is well understood in the art, such devices being common output devices in television systems, wherein optical images are created from electrical signals. Data and other information may be converted into electrical signals and thus reproduced and displayed. Such data and information and the image generated, may be pictorial in nature or non-pictorial. Further it may be encoded or not, and may be digital or analogue.

A number of practical limitations are inherent in the utilization of electron tube display devices such as cathode ray tubes. First, the size of the displayed image is limited by the maximum size cathode ray tube that can be practicably manufactured. Secondly, the image brightness that can be obtained is limited by the performance limits of the phosphors employed in the tube display face of the electron tube. Further, attempts to use "magic lantern" or optical image projection techniques to provide an enlarged image result in a correspondingly reduced image brightness, requiring a darkened viewing environment which restricts the viewer's ability to engage in other activities associated with the utilization of the displayed data.

A large-screen display, capable of being viewed under ordinary light conditions by a large group, is useful, for example, in theatre, television or in a military combat information center for display of a tactical situation.

Means of providing a visual display in response to information-bearing electrical signals, the intensity of which display is not limited by the general energy level of the electronic signal-converting device, have been sought through the use of birefringent electro-optic materials in cooperation with polarized light sources. In such general arrangement, an electrical charge pattern is impressed across the parallel faces of a birefringent optical material or in a direction longitudinal with the optic axis thereof, thereby inducing a corresponding pattern of elliptical polarization. Hence, a source of polarized light, polarized in a plane mutually orthogonal to that of the linear polarization of the electro-optic material, may now be projected by means of the cooperation of the crystal with a cross-polarization analyzer to provide a projected optical image. The size of the projected image will be determined by the geometry of the projection optics, and the brilliance of the projected image is determined by the brightness of the projection light source.

Prior efforts to apply such electro-optic materials to optical image projection have employed electron beam scanning techniques in which the electro-optic material was confined in the vacuum chamber of an electron beam gun, the emergent beam from the gun being caused to scan in synchonism with a scanning image-signal source, as discussed more fully, for example, in British Patent No. 442,381 issued on Feb. 7, 1936 to Dr. Karl Pulvari-Pulvermacher. Such efforts have met with limited success and little practical value, due to electron beam erosion of the electro-optic material, and due further to outgassing of the electro-optic material, which causes contamination or poisoning of the electron beam gun. Such outgassing or sublimation of the electro-optic material results from the relatively high vapor pressure thereof (in combination with the evacuated atmosphere required for operation of the electron beam gun), and tends to be further increased due to the thermal conversion resulting from both changes in electron beam momentum and optical energy absorption in the electro-optic material.

One means for avoiding such problem of sublimation has been the substitution of a dielectric tape for the electron beam gun, whereby the requirement of an evacuated chamber is obviated. In such an arrangement, electrostatic charge patterns are inpressed upon the tape, and the tape transported past a face of the electro-optic crystal, as is more fully described in U.S. patent application Ser. No. 365,453, filed May 6, 1964, now Patent No. 3,352,967, by Carl A. Wiley, assignor to North American Aviation, Inc., assignee of the subject invention. A principal difficulty in such technique is in the necessity of a mechanical tape transport device, and the difficulty of transporting, unimpaired and without loss or distortion, the stored electrostatic charge patterns so recorded.

Other prior art efforts to cope with the sublimation problem, associated with the use of an electron beam gun, have included attempts to contain the sublimation products by sealing the electro-optic material with dielectric coatings, so as to remove it from the vacuum envelope. One such method involves the location of the electro-optic crystal outside of the electronic beam tube with a face of the crystal pressed against the glass face of the tube, as described more fully in British Patent No. 445,106, issued Apr. 1, 1936, to the above noted Dr. Pulvari. Such attempts were unsuccessful for a number of reasons. The thickness of the glass face, while sufficient to seal or isolate the electro-optic crystal, also prevented the landing of the electrons from the electron beam gun upon the surface of the electro-optic material. Instead, the electrons were deposited upon the surface of the dielectric sealant provided by the glass faceplate, with the result that the consequent electric field across or through the compound structure of crystal and faceplate was insufficient to effectively or fully modulate the electro-optic material. Also, the electric field was so distributed transversely to the desired direction of the field gradient as to reduce the spatial, or image, resolution of the resultant image pattern; in other words, a component field corresponding to a discrete element of the image pattern was developed parallel to the face of the electro-optic material, as well as across the thickness between the two parallel faces of the electro-optic material (i.e., transverse to the optical axis of the material as well as parallel thereto). Further, the time constant or time delay of the electric field in leaking through the dielectric, seriously reduces the maximum allowable data rate, or frame-rate at which the image may be changed.

By means of the concept of the subject invention, electron beam modulation of a birefringent electro-optic material may be achieved within an evacuated chamber without suffering the effects of sublimation and the performance limitations of the prior art.

In accordance with a preferred embodiment of the invention, a composite material is provided in an electron tube, and comprises a wafer of birefringent material, one face of which is sealingly coated with a discretely secondarily-emissive, dielectric film, and an opposite face of which is bonded to an electrically conductive layer, the faces being normal to the optic axis of the material.

In normal use of the material for influencing a beam of polarized light, an electron beam irradiates the dielectrically coated face of the wafer, only the discrete surface element or local spot so irradiated becoming secondarily emissive or conductive during the period of such irradiation or electron bombardment. Hence, sealing to prevent sublimation and erosion is effected, while preserving both image resolution and speed of response. In other words, the electro-optic material is physically isolated from its environment, while the electrical continuity of the system is maintained.

Accordingly, it is an object of the subject invention to provide a composite material having improved electro-optic properties.

It is another object of the subject invention to provide a coated electro-optic material the dielectric coating of which physically isolates the electro-optic material from an evacuated environment while maintaining the electrical continuity therewith by electron bombardment-induced conductivity.

It is yet another object of the invention to provide a composite electro-optic material having improved image resolution.

It is still another object of the invention to provide an electronic image projection tube having an improved transient response.

It is a further object of the invention to provide an electronic image projection device of improved image resolution.

It is yet a further object of the invention to provide an electronic image projection means for modulating an external source of illumination to project an optical image with improved resolution.

It is still a further object of the invention to prevent the sublimation of a modulated electro-optic material in the evacuated chamber of a modulating electron beam gun, while preserving the image resolution and speed of response of such material to the irradiating beam from said electron beam gun.

These and other objects of the subject invention will become apparent from the following specification, taken together with the accompanying drawings, in which.

Figure 1:
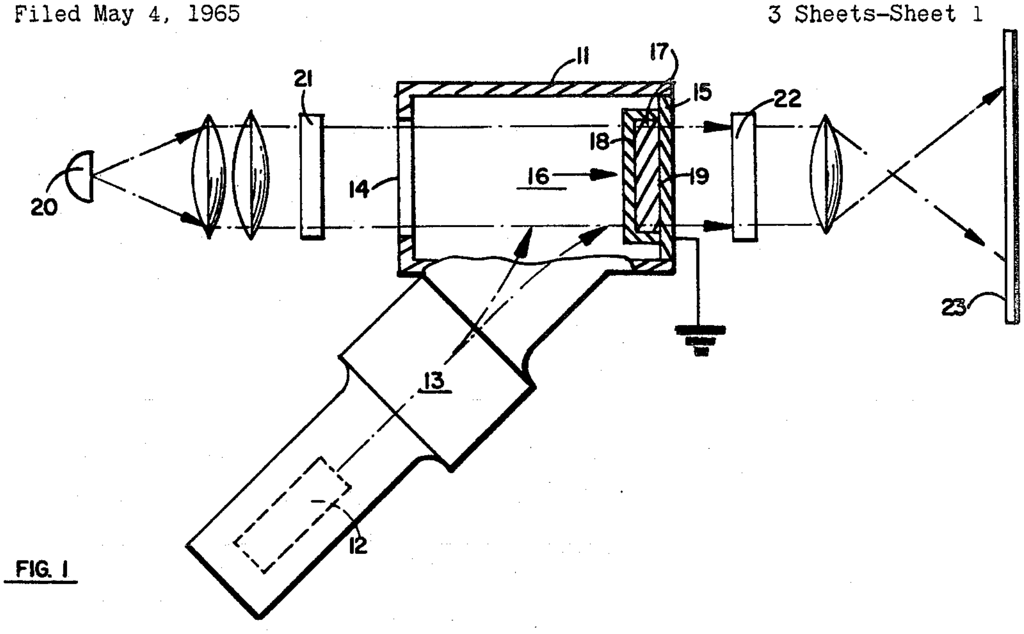
FIG. 1 is a schematic diagram of a device illustrating the concept of the invention.

FIGS. 4*a*, 4*b*, 4*c* and 4*d* are series representations of several composite electro-optic materials, comparing the device of the invention to that of the prior art.

In the drawings, like reference characters refer to like parts.

Referring now to FIG. 1, there is illustrated in schematic form a device embodying the inventive concept. There is provided an electronic tube 11 having an electron beam gun 12 and deflection control means 13 for modulation or controlling the direction of an irradiating electron beam provided by gun 12. Tube 11 has two in-line light-transmission windows 14 and 15 on opposite sides of tube 11 for providing a light path therethrough for a beam of polarized light to be influenced.

A wafer 16 of a composite material comprising a sealed electro-optic material is disposed and oriented within tube 11 so that a first face 18 thereof is in the path of the irradiating electron beam. A second face or back surface

19 thereof is bonded to an optically transmissive, electrically conductive material adapted to be maintained at a different electrical potential relative to that of the electron beam, in the manner of an anode. The first or front face 18 of the electro-optic material 17 is sealingly coated with an optically transparent, discretely secondarily emissive, dielectric film. The dielectrically coated surface 18 of the electro-optic material 17 is further disposed and oriented within tube 11 as to be within the path of a beam of polarized-light-to-be-influenced.

Such beam of polarized light may be provided by a light source 20 directed at one of windows 14 and 15, and a polarizer 21 interposed between source 20 and such window 14. Hence, a polarized beam of light will be transmitted through window 14 into tube 11, through wafer 16, and emerge from window 15. A polarization analyzer 22 is placed in the path of the emergent light beam, and oriented so that its plane of polarization is crossed, or mutually perpendicular, to that of polarizer 21. Hence, any polarization component of the emergent light (from window 15) which is parallel to the polarization plane of polarizer 21 (and perpendicular to that of polarization analyzer 22) will not be transmitted or projected through analyzer 22.

In normal operation of the above described arrangement, the irradiation of a discrete area or spot of the dielectric film 18 by the electron beam produces electron bombardment-induced conductivity therein. In other words, such irradiated spot or local area of the dielectric film becomes secondarily emissive or locally conductive, whereby the corresponding spot on the front face 18 of the electro-optic crystal 17 and the conductive layer on the back face 19 of the crystal 17 serve as plates of a charged capacitor, the charge being provided by the electrons in the electron beam.

The discrete electrostatic field produced by such capacitor is longitudinal with the optic axis of the material and produces a retardation component of the coincident light energy, causing a rotation of the plane of polarization of the polarized light impinging on that spot or discrete area of the composite electro-optic material 17. (The locally induced conductivity is not permanent, the dielectric material reverting to its natural state upon removal of the bombarding electron beam.)

The remaining, nonirradiated, area of the dielectric film does not become conductive, and hence no rotation of the plane of polarization occurs for the polarized light illuminating such remaining area of the electro-optic material.

The emergent light from the coated electro-optic material is projected through cross polarization analyzer 22 to a projection screen 23. The analyzer being transmissive only to the rotated polarization component associated with the irradiated spot or discrete area element of the electro-optic wafer 16, only a light spot corresponding to such irradiated spot, will be emergent from analyzer 22 and projected upon viewing screen 23. The brightness of the projected spot will be determined by the brightness of light source 20 and the sine of the polarization angle of rotation. The rotation of the angle of polarization, in turn, will be a function of the writing voltage or modulation intensity of the potentials applied across the electro-optic crystal at the local area of the irradiated spot.

The electro-optic material of which the composite or sealed wafer 16 of FIG. 1 is comprised may, in a preferred arrangement, be polished potassium di-deuterium phosphate, such material having a relatively large longitudinal electro-optic coefficient. However, other electro-optic materials may be employed, such as, for example, potassium dihydrogen phosphate or ammonium dihydrogen phosphate. A polished electro-optic crystal as thin as 0.01 inch is capable of supporting the required electrostatic potentials (3.4 kv.) for the optical system of FIG. 1. Such thinness of the electro-optic crystal is desired for two reasons. First the thinner the crystal the less the resultant fringe field affect upon the applied electrostatic field between the anode and the discrete area to which the electron beam is directed, and the better the consequent image resolution. Also, the thinner the crystal, the less the required voltage across the crystal for excitation thereof, thereby reducing the erosion produced by thermal conversion of the impinging electron beam.

The optically transmissive, electrically conductive layer to which the electro-optic material is bonded, and which serves as an anode for the electron beam, may be composed of tin oxide, applied by means of vapor deposition or like means known in the art for applying a film.

The discretely secondarily-emissive, optically-transmissive dielectric coating applied (by vapor deposition) to the front face of the electro-optic wafer in FIG. 1 may be composed of silicon monoxide/dioxide or magnesium fluoride, deposited to a thickness not exceeding 15,000 Angstroms so as to reduce lateral conduction and scattering of the electron beam and to reduce distortion of and fringe field effects on the electric field, and to allow the phenomenon of electron bombardment-induced conductivity. Such film should, however, be thick enough to assure a continuous film for positive sealing of the front face of the electron optic material against sublimation and electron beam erosion, a thickness between 1,000 and 5,000 Angstroms being preferred.

The local conductivity effect, referred to herein alternatively as electron bombardment induced conductivity and discrete secondary emission, appears to be the result of ionization of dielectric atoms by high energy electrons. As a result of the electric field between the cathode and the anode, the holes and electrons acquire velocities and effect a conduction of current through the dielectric to the penetration depth that will produce ionization. This ionization appears to be reversible, with the dielectric reverting to its normal state when the electron beam is removed from the discrete element or spot so affected.

Prior to applying or vapor-depositing either of the films to the electro-optic crystal, such crystal must be suitably prepared for such application by being cleaned and then being polished to a relative optical flat by well known optical techniques. After polishing, the surface of the crystal is further cleaned by placing it in that vacuum chamber in which the vapor deposition is to occur, and either subjecting the surface of the crystal to ion bombardment or a limited amount of heat in order to impart an escape velocity to the surface contaminants, particularly water molecules.

Figure 2:
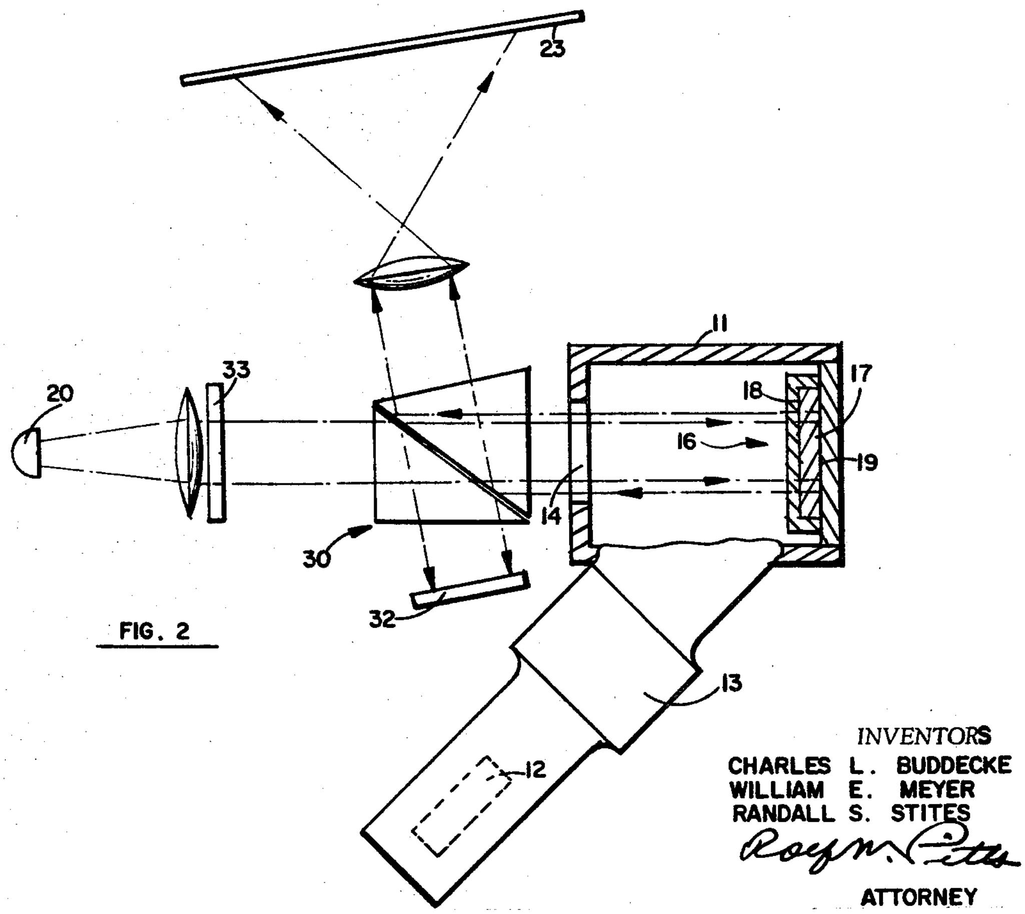
FIG. 2 is a schematic diagram of a preferred device embodying the concept of the invention.

Although the illustrated arrangement of FIG. 1 provides an image of improved resolution and satisfactory brilliance, a preferred arrangement employs an optically-reflective, electrically-conductive coating on the electro-optic material, as shown in FIG. 2.

Referring to FIG. 2, there is shown a preferred arrangement embodying the concept of the invention. There is provided a reflex system for performing the function of the device of FIG. 1, the electron beam tube 11 of FIG. 2 requiring only one window 14, and the back face 19 of the coated electro-optic material 17 being bonded to an optically-reflective, electrically-conductive layer such as aluminum. Alternatively, the crystal of FIG. 1, being bonded to an optically-transmissive, electrically-conductive layer, may be further bonded to a reflective coating, laid over the electrically-conductive layer in order to serve in the reflex optical system of FIG. 2. There is also provided a light beam-splitter 30, such as a Foster prism or modified Glans-Thompson prism for transmitting a selected polarization component of light from a source 20 through window 14 through the composite electro-optic material 17 to the reflective back surface 19 thereof, and transmitting a cross-polarization component of the reflected light therefrom, emerging from window 14, to a projection screen 23. A light stop 32, such as black velvet or like non-reflective material, may be used in cooperation with beam-splitter 30 to stop the transmission of the selected (original) polarization components reflected from element 16. Further, an optically transmissive heat shield 33 may be interposed between the light source 20 and prism 30 to reduce the transmission of heat associated with the brilliant light source 20.

Figure 3:
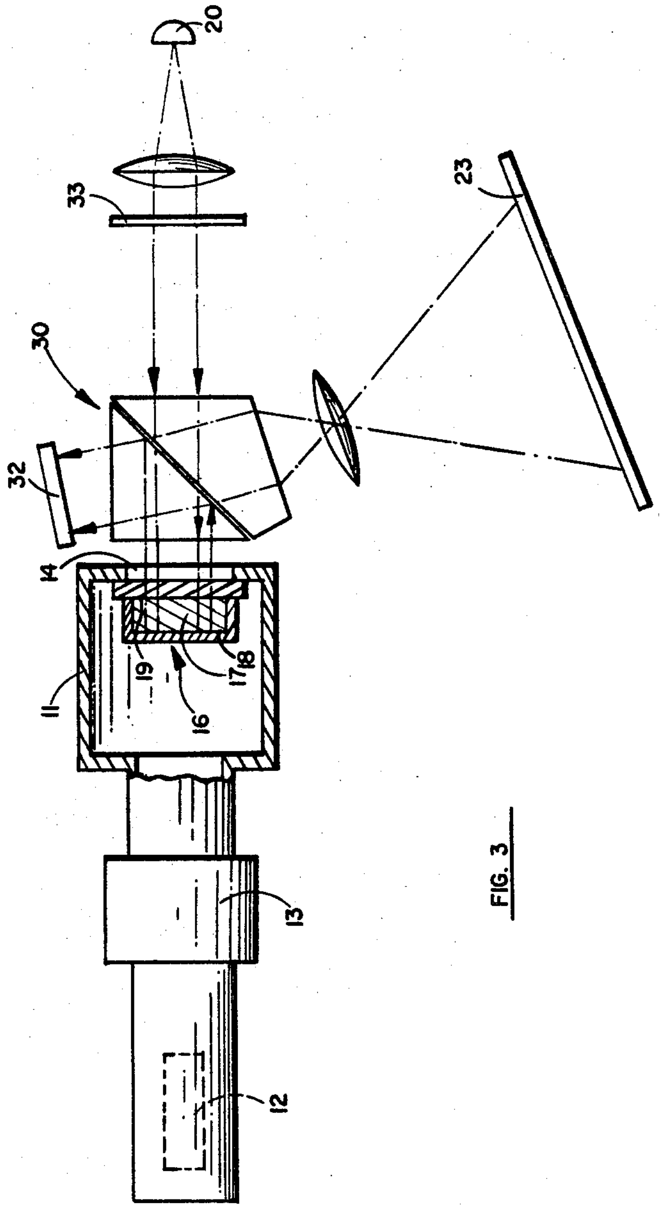
FIG. 3 is a schematic diagram of an alternate device embodying the concept of the invention.

In an alternate embodiment of the reflex optical arrangement of FIG. 2, the anode or conductive surface of the electro-optic material is optically transmissive and the reflective surface is provided by the dielectric coating, the projected light being projected through the optically transmissive anode coating, as shown in FIG. 3.

In the alternate arrangement of FIG. 3, the projected polarized light from modified beam splitter 30 is projected through window 14 and an optically-transmissive, electrically-conductive coating on front face 18 of electro-optic crystal 17, to an optically-reflective, locally secondarily-emissive dielectric coating on the opposite or back face 19 of crystal 17, which dielectric coating is exposed to irradiation by an electron beam from electron beam gun 12. The projected light is reflected back through beam splitter 30. and a cross polarization component thereof projected upon screen 23.

The optically-transmissive anode coating on the front face 18 of crystal 17 may be tin oxide, as in the case of the device of FIG. 1. The optically-reflective coating on the back face 19 of crystal 17 (in FIG. 3) may be any dielectric film of high refractive index and of an optical thickness equal to an odd integer multiple of quarter wavelengths $(2n+1)\lambda/4$ of the color or centroid frequency of the spectra to be modulated, as is well understood in the art. Such optically reflective dielectric film may be comprised, for example, of multilayer dielectric coatings alternately of zinc sulfide and cryolite, as is more fully described at pp. 284–288 of "Vacuum Deposition of Thin Films" by Holland, published by John Wiley & Sons, Inc. (1960).

By means of the reflex optical arrangements of FIGS. 2 and 3, the modulated light beam traverses the thickness of the modulating electro-optic material twice (once upon projection onto reflective surface 19 and a second time after being reflected from surface 19). The birefringent effect along the optical path parallel to the optic axis being cumulative with the length of the path, the electric field parallel to the optic axis of the electro-optic material need only be one-half that of the refractive optical system (of FIG. 1) for like effect. Also, because the required electric field may be reduced, a thinner crystal (as thin as .005 inch) may be thus employed in the arrangement of FIG. 2 without exceeding the dielectric breakdown limit of the electro-optic material. Further, because the reflex optical arrangement uses a thinner electro-optic crystal than the arrangement of FIG. 1, less fringe field effect occurs in an electrostatic field applied across the crystal, thereby further improving the resultant image resolution.

Such advantages of the composite material of the invention, relative to the prior art, may be more easily appreciated by reference to FIG. 4.

Figure 4B:
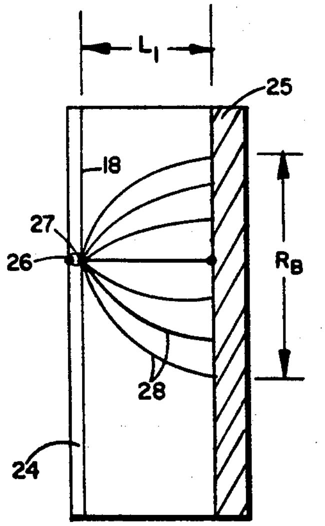
Figure 4A:
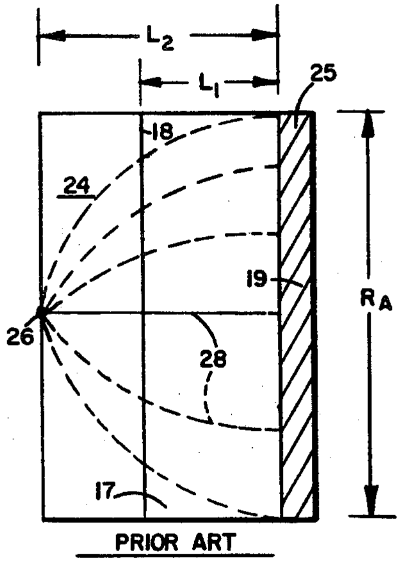

Referring to FIG. 4*a*, there is illustrated a cross section of a dielectrically coated electro-optic crystal, the overcoat thickness sealing the crystal against outpassing or sublimation and protecting it against erosion due to thermal conversion of an impinging electron beam directed, say, at point 26, such point and a conductive back face 25 providing the plates of a capacitor for applying an electrostatic field across an electro-optic material 17 (dimension $L_1$), and resulting in the fringe field effect indicated by dotted lines 28. It is to be appreciated that the resulting field produced across the dimension $L_1$ of the electro-optic crystal 17 is less than the total field developed across the total dimension $L_2$. Also, such total dimension $L_2$ results in an increased dimension, $R_A$, of the fringe field effect, representing poorer image resolution of spot 26. Further, such arrangement demonstrates an undesirable transient response to changes or modulation of the electron beam intensity and position due to the electrical circuit characteristics of such arrangement, an equivalent circuit for which is shown in FIG. 4*d*. The output voltage $e_0$ in FIG. 4*d* represents the electrostatic potential applied across electro-optic material 17 in FIG. 4*a*, which material is represented in FIG. 4*d* by the lumped circuit parameters $R_2$ and $C_2$. The input voltage $e_i$ in FIG. 4*d* represents the total electrostatic potential applied across the dimension $L_2$ of FIG. 4*a*, the dielectric coating 24 of which is represented in FIG. 4*d* by the lumped parameters $R_1$ and $C_1$. Due to the practical difficulties in seeking to match the parameters of the circuit of FIG. 4*d* by adjustment of the geometry of FIG. 4*a*, the generally attainable transient response of such prior art arrangement seriously limits the data rate or speed at which the crystal may be modulated.

Figure 4C:
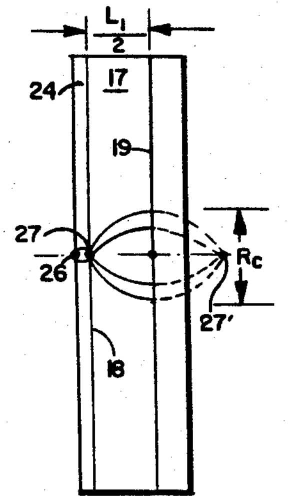
Figure 4D:
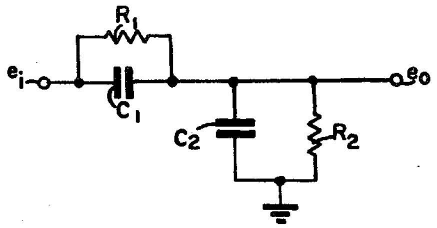

Referring to FIGS. 4*b* and 4*c*, there is illustrated a crystal coated in accordance with the concept of the invention for a respective refractive (transmissive) and reflex optical system application. The dielectric layer 24 of FIGS. 4*b* and 4*c*, being selectively thin, not only seals the electro-optic crystal 17 against outgassing and protects it from electron beam erosion, but avoids a field effect through such selectively thin dielectric film. The film being thin enough to become locally conductive or secondarily emissive at a discrete area or spot under electron bombardment by an irradiating electron beam, the resulting electrostatic field is developed across only the electro-optic material. In this way, a lower total electric charge potential may be employed to develop the necessary electrostatic field across crystal 17. Further, because the final point 27 at which the electrons are deposited is at the front face 18 of the crystal 17 rather than the front face of the dielectric 24, the fringe field effect (lines 28) upon the resultant electrostatic field through crystal 17 is reduced, thereby improving the resultant image resolution (e.g., dimension $R_B$ in FIG. 4*b* and $R_C$ in FIG. 4*c* are each less than $R_A$ in FIG. 4*a*). Moreover, because the irradiated spot 26 of dielectric film in FIGS. 4*b* and 4*c* is secondarily emissive, or becomes conductive under electron bombardment, the lumped parameters corresponding to $R_1$ and $C_1$ of the equivalent circuit of FIG. 4*d* are not present, and a regularly improved transient response or maximum data rate is obtained.

The arrangement of FIG. 4*c*, wherein an optically-reflective electrically conductive coating is employed on the back face 19 of crystal 17 for use in a reflex optic arrangement illustrates that the lesser crystal thickness required in such application results in yet a further improvement in the image resolution, indicated by the decreased dimension $R_C$ relative to the corresponding one, $R_B$, of FIG. 4*b*, in addition to a reduction in the required electrostatic potential. Such improved image resolution for a like overall optic path length as FIG. 4*b*

$$\left(\frac{2L_1}{2}=L_1\right)$$

may also be appreciated from the fact that the total effective fringe field provided by the reflective optical device of FIG. 4*c* resembles two point sources, 27 and 27', separated by the distance $L_1$, one of which sources is the mirror image of the other, rather than being a large plane. Hence, it is to be appreciated that the reflective composite material of FIG. 4*b* is a preferred embodiment of the invention, to be used in a reflex optical system such as that shown in FIG. 2.

Accordingly, there has been described a composite material useful in cooperation with an electron beam for influencing a beam of polarized light. By means of such novel composite material in a polarization-sensitive projection system, an optical image of improved resolution may be obtained in response to position and amplitude modulation of the electron beam, without suffering adverse transient response, outgassing or electron beam erosion of the electro-optic material.

Although the composite electro-optic material of the invention has been described as useful for the modulation of light in a display projection application, the device is not so limited, optical image storage devices such as photographic films and the like, being readily substituted for the illustrated display screen. Also, the use of such device is not limited to the modulation of visible light, but may include the modulation of radiant energy selected within the spectra of that subject to influence or phase-retardation by the birefringent properties of such electro-optic material, for recordation of images of such modulated energy upon suitable recording media, responsive to such selected spectra.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A device for influencing a beam of polarized light comprising an electro-optic material, one face of which is sealingly coated with a locally secondarily emissive dielectric film of one of silicone monoxide/dioxide and magnesium fluoride and not exceeding a thickness of 15,000 angstroms, and an opposite face of which is connected to a conductive layer.

2. A device for influencing a beam of polarized light comprising an electro-optic material, having at least one face sealingly coated with a discretely secondarily emissive dielectric film of one of silicone monoxide/dioxide and magnesium fluoride and not exceeding a thickness of 15,000 angstroms, and an opposite face bonded to an electrically conductive layer.

3. The material of claim 2 in which both said dielectric film and conductive layer are optically transparent.

4. The material of claim 2 in which one of said dielectric film and conductive layer is optically transparent and the other is optically reflective.

5. The material of claim 2 in which said dielectric film is optically transparent and said conductive layer is optically reflective.

6. The material of claim 2 in which said dielectric film is optically reflective and said conductive layer is optically transparent.

7. Apparatus for influencing a beam of polarized light by electrical means, in which an electro-optic material for rotating the plane of polarization of such light under the action of an electric field is provided in the path of such light, wherein one face of said electro-optic material is sealingly coated with a dielectric film of one of silicone monoxide/dioxide and magnesium fluoride and not exceeding a thickness of 15,000 angstroms, a discrete area of which film becomes electrically conductive upon being irradiated by an electron beam, whereby a modulating electric field is applied to a corresponding discrete area of said electro-optic material.

8. Apparatus for influencing a beam of polarized light by electrical means, in which an electro-optic material for rotating the plane of polarization of such light under the action of an electric field is provided in the path of such light, wherein one face of said electro-optic material is sealingly coated with a dielectric film not exceeding fifteen thousand angstroms in thickness, said film being adapted to be irradiated by a modulated electron beam for applying a corresponding modulated electric field across said electro-optic material.

9. Means responsive to an electron beam for correspondingly modulating the polarization of a projected polarized light beam in accordance with a modulation of said electron beam, comprising a plate of electro-optic material adapted to be placed in the path of said light, a first face of which material is adapted to be irradiated by an electron beam and is disposed in a vacuum chamber containing said electron beam;

a dielectric coating, not exceeding fifteen thousand angstroms in thickness, sealingly deposited upon siad first face of said material as to be interposed therebetween and said electron beam for providing a spatially discrete electrically conductive coating induced therein in response to electron bombardment of a discrete point thereof by said beam; and an electrically conductive coating proximate the opposite side of said electro-optic material and adapted to be maintained at an electric potential relative to that of said electron beam, whereby an electric field is maintained across said material between said discrete point and said conductive coating for producing a birefringence pattern.

10. Apparatus for influencing a beam of polarized light by electrical means, in which a wafer of electro-optic material for rotating the plane of polarization of such light under the action of an electric field, is provided in the path of such light, wherein one face of said electro-optic material is sealingly coated with a dielectric film of one of silicone monoxide/dioxide and magnesium flouride and not exceeding fifteen thousand angstroms in thickness, said film being adapted to be irradiated by a modulated electron beam, for applying a corresponding modulated electric field across said electro-optic material, and an opposite face of said electro-optic material is sealingly coated with an optically reflective, electrically conductive structurally rigid surface.

11. Reflex optical means for influencing a beam of polarized light by electrical means comprising an electron beam tube for providing an irradiating electron beam and having an optically transmissive window adapted for admitting a beam of polarized light-to-be-influenced;

a plate of electro-optic material disposed in said tube, a first surface of said plate being in the path of said irradiating electron beam, a second surface thereof being bonded to an optically-reflective electrically conductive material adapted to be maintained at a difference electrical potential relative to that of said electron beam, said first surface of said plate being sealingly coated with an optically-transparent dielectric film of one of silicone monoxide/dioxide and magnesium fluoride and not exceeding a thickness of 15,000 angstroms, a discrete surface of which film providing a secondary emission in response to being irradiated by said electron beam, said dielectrically coated surface of said electro-optic material being further disposed and oriented within said tube as to be within the path of said beam of polarized light to be influenced; and a polarization analyzing light-beam splitter arranged to cooperate with said window of said tube and said reflective second surface of said plate to provide a polarization-sensitive reflex optical system.

References Cited

UNITED STATES PATENTS 2,983,824 5/1961 Weeks et al. ________ 178—7.5 X

RODNEY D. BENNETT, *Primary Examiner.*

J. P. MORRIS, *Assistant Examiner.*